Patented Apr. 13, 1943

2,316,215

UNITED STATES PATENT OFFICE 2,316,215

PRODUCTION OF AMINO ACIDS FROM THEIR HYDROHALIDES

Paul R. Austin, Wilmington, Del., assignor to E. I. du Pont de Nemours & Company, Wilmington, Del., a corporation of Delaware No Drawing. Application October 17, 1941, Serial No. 415,487

16 Claims. (Cl. 260—534)

This invention relates to the liberation of amino acids from their hydrohalides and more particularly comprises a process for liberating amino acids from their hydrohalides by the addition of pinene preferably in the presence of a mutual solvent.

The several previous methods of liberating amino acids from their hydrohalides are not entirely satisfactory as they either require expensive materials, involve tedious manipulations or do not give a final product of high purity. One of the previous methods, which is commonly recommended for liberating amino acids from their hydrohalides, consists in heating an aqueous solution of an amino acid hydrohalide with an excess of lead or silver oxide, saturating the solution of amino acid salts thus obtained with hydrogen sulfide and then removing the insoluble metal sulfides to obtain an aqueous solution of the free amino acid. Such a method possesses the disadvantages of requiring an involved procedure and somewhat expensive materials.

Another method heretofore frequently used to liberate amino acids from their hydrohalides consists in treating an alcoholic solution of an amino acid hydrohalide with an amine, such as aniline or pyridine, which is more basic than the amino acid and which furthermore forms an alcohol-soluble hydrohalide. The alcohol-insoluble amino acid is thus displaced from its salt and caused to precipitate from the solution in a more or less impure state. Such a method possesses the disadvantages of requiring a somewhat involved procedure and of not invariably yielding a pure product.

This invention has as an object a process for liberating amino acids from their hydrohalides. A further object is to provide a simple, inexpensive and satisfactory process for the liberation of amino acids from their hydrohalides. Another object is to provide a process for obtaining a satisfactory yield of amino acids in a high degree of purity from their hydrohalides. Other objects will appear hereinafter.

These objects are accomplished by a process which comprises reacting the hydrohalide of an amino acid with pinene preferably in the presence of a mutual and substantially non-reactive or inert solvent. The reaction may be carried out at suitable temperatures up to 250° C., and preferably between 60° and 140° C. The corresponding free amino acid is obtained as a final product of this process. The pinene for use in this invention may be obtained from turpentine oil, using the fractions boiling between 154°–166° C. which represent pinene.

The preferred form of this invention is carried out substantially as follows:

An excess of pinene is added to a solution of an amino acid hydrohalide in substantially anhydrous ethyl or methyl alcohol and the mixture is refluxed for several hours, during which time the liberated amino acid is gradually precipitated as an insoluble powder which may be filtered off and dried. Where the free amino acid is appreciably soluble in alcohol, as is the case of beta-alanine and epsilon-amino-caproic acid, it is necessary to cool the refluxed solution prior to filtration in order to insure precipitation of the free amino acid.

This process may be employed to liberate the corresponding amino acid from any amino acid hydrohalide. The hydrohalides of any amino acid may be represented by the general formula Y—Z—COOH.HX, in which Z is any divalent organic radical containing at least one substituted or unsubstituted amino group, Y is a member selected from the group consisting of any organic radical and hydrogen, and X is a halogen. Typical examples of suitable amino acid hydrohalides are the hydrohalides of glycine, lysine, tryptophane and N,N - dimethyl valine. The amino acid hydrohalides can be obtained by any of the usual methods, such as acid hydrolysis of amino nitriles, of vegetable or animal proteins, or of amino acid esters.

Commercial grades of pinene boiling in the range of 154°–166° C. may be used in this process. However, instead of pinene boiling in the range of 154°–166° C., either pure alpha, beta, or gamma pinene may be used. Inasmuch as these three closely related compounds constitute the major portion of the fraction of turpentine oil which boils at 154°–166° C., any turpentine fraction boiling in this temperature range can be employed. In most cases it is desirable to use a large excess of pinene in order to hasten the completion of the reaction. This practice is not uneconomical because the mother liquors from various runs may be repeatedly reacted with fresh portions of amino acid hydrohalides by adding sufficient additional pinene to replenish the pinene consumed in each preceding run.

The preferred solvents are the lower aliphatic, monohydric alcohols which contain not more than 25 per cent, and preferably no water. These organic materials are good solvents for amino acid hydrohalides and pinene, but are very poor solvents for free amino acids. Furthermore, under the prescribed conditions, these solvents are substantially inert and do not react appreciably with the hydrohalide, with pinene, or with the liberated amino acid. In general, any solvent may be used in this invention which will dissolve both the amino acid hydrohalide and the pinene and which will not enter appreciably into reaction with these compounds and the free amino acid. Technical grades of substantially anhydrous ethyl or methyl alcohol are quite suitable although aqueous alcohols containing at least 75 per cent alcohol may be employed.

Also a solvent mixture may be employed, and as a rule the amount and nature of the solvent should be chosen so as to furnish a substantially inert reaction medium in which the liberated amino acid is insoluble but which is a good solvent for the amino acid hydrohalide and pinene. Examples of suitable solvents or solvent mixtures are methyl, ethyl, propyl and butyl alcohols; methyl alcohol-diethyl ether; methyl alcohol-ethylene dichloride; ethyl alcohol-dioxane; acetone-water; ethyl alcohol-acetone; and methyl alcohol-benzene. Naturally the amount and composition of the solvent will vary with the solubility characteristics of the amino acid hydrohalides and the corresponding free amino acids. Thus, with the hydrohalide of alcohol-soluble but ether-insoluble alpha-ethylamino-n-caproic acid, a mixed solvent such as ethyl alcohol-diethyl ether will be more suitable than methyl alcohol.

The preferred temperature range is from 60° to 140° C. and frequently is in the immediate neighborhood of 100° C., but any temperature up to 250° C. may be employed. Generally it is most convenient to operate at the reflux temperature of the solvent used, although in cases where the conversion of the amino acid hydrohalide takes place very slowly, it is often desirable to carry out the reaction at temperatures above the boiling point of the solvent under superatmospheric pressures in a closed reaction vessel. From 1 to 12 hours are usually required to carry out the process.

This invention is further illustrated by the following examples in which the amounts are expressed in parts by weight.

Example I

To a solution of 100 parts of glycine hydrochloride in 1500 parts of substantially anhydrous ethyl alcohol is added 500 parts of pinene. The mixture is refluxed for 7 hours whereupon 55 parts or 74 per cent of the theoretical amount of glycine are gradualy precipitated from the boiling mixture. The glycine so formed melts in the neighborhood of 210 C. and does not depress the melting point when mixed with an authentic sample of glycine.

Example II

Sixty parts of dl-valine hydrochloride are dissolved in 500 parts of substantially anhydrous ethyl alcohol and the resulting solution is then refluxed for 10 hours with 1000 parts of pinene. The refluxing mixture gradually deposits 20 parts of pure dl-valine which represents 42 per cent of the theoretical amount. Analysis: Calculated for $C_5H_{12}O_2N$: N, 11.96. Found: 11.82.

Example III

One hundred parts of beta-alanine hydrochloride, dissolved in 700 parts of substantially anhydrous ethyl alcohol, are refluxed for 12 hours with 500 parts of pinene. On cooling the refluxed solution in ice, 40 parts of crystalline material, melting at 92°-104° C., are obtained. On recrystallization from aqueous alcohol pure beta-alanine is obtained. Calculated for $C_3H_7O_2N$: N, 15.73. Found: N, 15.70.

Example IV

To a solution containing 10 parts of glycine hydrochloride in 75 parts of dioxane and 175 parts of substantially anhydrous methanol, are added 100 parts of pinene. The mixture is then refluxed for 10 hours during which 5 parts of glycine are gradually precipitated from solution.

Example V

To a solution of 10 parts of glycine hydrochloride in 700 parts of substantially anhydrous methanol are added 100 parts of ethylene dichloride and 100 parts of pinene. When refluxed for 7 hours this mixture yields 5 parts of pure glycine.

The foregoing examples illustrate the preferred embodiment of this invention in liberating selected amino acids from their hydrohalides. Other amino acids can be liberated in a similar manner by subjecting their hydrohalides with pinene to heating at temperatures ranging up to 250° C. in the presence of a mutual solvent. The time required for this process will naturally vary with such factors as nature of the solvent, the temperature and pressure, and also the amino acid hydrohalide employed. Weakly basic amino acids, such as lysine, will generally react more rapidly than others and therefore will require a shorter time.

The hydrohalides of alcohol-insoluble amino acids are particularly well adapted to the process of this invention. It is also possible, and sometimes desirable, to use a mixture of amino acid hydrohalides, such as the mixture obtained by acid hydrolysis of caseine, corn gluten or other animal or vegetable proteins. In such instances, of course, the final product is a mixture of free amino acids. The hydrochlorides and hydrobromides of the amino acids are preferred for use in this process because they are easily obtainable and readily yield the corresponding uncontaminated amino acids. The hydroiodides and hydrofluorides of the amino acids may also be used but they are not as readily available.

With certain amino acid hydrohalides a larger excess of pinene may be used so that pinene itself becomes the solvent. In such cases the absence of a solvent other than pinene necessitates the use of higher temperatures. However, a mutual solvent is preferred as it generally is more efficient.

The amino acids obtained by this process may be used as protein substitutes in poultry and livestock feeds, as intermediates in the synthesis of taste producing chemicals, as surface active compounds and corrosion inhibitors, and as polyamide intermediates. Also the amino acids or mixtures of amino acids obtained in this manner can be used in intravenous feeding.

As many apparently widely different embodiments of this invention may be made without departing from the spirit and scope thereof, it is to be understood that I do not limit myself to the specific embodiments thereof except as defined in the appended claims.

I claim:

1. A process for the liberation of amino acids from their hydrohalides which comprises reacting an amino acid hydrohalide with pinene in the presence of a mutual solvent for the amino acid hydrohalide and pinene.

2. A process for the liberation of amino acids from their hydrohalides which comprises subjecting an amino acid hydrohalide with pinene to heating at temperatures up to 250° C. in the presence of a mutual solvent for the amino acid hydrohalide and pinene.

3. A process for the liberation of amino acids from their hydrohalides which comprises reacting an amino acid hydrohalide with a fraction of turpentine oil boiling between 154°–166° C. in the presence of a mutual solvent for the amino acid hydrohalide and said fraction of turpentine oil.

4. A process for the liberation of amino acids from their hydrohalides which comprises reacting an amino acid hydrohalide with pinene in the presence of a mutual and substantially non-reactive solvent for the amino acid hydrohalide and pinene.

5. A process for the liberation of amino acids from their hydrohalides which comprises reacting an amino acid hydrohalide with pinene in the presence of solvent quantities of ethyl alcohol as a mutual solvent for the amino acid hydrohalide and pinene.

6. A process for the liberation of amino acids from their hydrohalides which comprises reacting an amino acid hydrohalide with pinene in the presence of solvent quantities of methyl alcohol as a mutual solvent for the amino acid hydrohalide and pinene.

7. A process for the liberation of glycine from glycine hydrochloride which comprises reacting glycine hydrochloride with pinene in the presence of a mutual solvent for the glycine hydrochloride and pinene.

8. A process for the liberation of glycine from glycine hydrochloride which comprises reacting glycine hydrochloride with pinene in the presence of solvent quantities of ethyl alcohol as a mutual solvent for the glycine hydrochloride and pinene.

9. A process for the liberation of glycine from glycine hydrochloride which comprises reacting glycine hydrochloride with pinene in the presence of solvent quantities of a lower aliphatic alcohol as a mutual solvent for the glycine hydrochloride and pinene.

10. A process for the liberation of beta-alanine from beta-alanine hydrochloride which comprises reacting beta-alanine hydrochloride with pinene in the presence of a mutual solvent for the beta-alanine hydrochloride and pinene.

11. A process for the liberation of beta-alanine from beta-alanine hydrochloride which comprises reacting beta-alanine hydrochloride with pinene in the presence of solvent quantities of ethyl alcohol as a mutual solvent for the beta-alanine hydrochloride and pinene.

12. A process for the liberation of beta-alanine from beta-alanine hydrochloride which comprises reacting beta-alanine hydrochloride with pinene in the presence of solvent quantities of a lower aliphatic alcohol as a mutual solvent for the beta-alanine hydrochloride and pinene.

13. A process for the liberation of valine from valine hydrochloride which comprises reacting valine hydrochloride with pinene in the presence of a mutual solvent for the valine hydrochloride and pinene.

14. A process for the liberation of valine from valine hydrochloride which comprises reacting valine hydrochloride with pinene in the presence of solvent quantities of ethyl alcohol as a mutual solvent for the valine hydrochloride and pinene.

15. A process for the liberation of valine from valine hydrochloride which comprises reacting valine hydrochloride with pinene in the presence of solvent quantities of a lower aliphatic alcohol as a mutual element for the valine hydrochloride and pinene.

16. A process for the liberation of amino acids from their hydrohalides which comprises reacting an amino acid hydrohalide with such an excess of pinene as to form a solvent for the amino acid hydrohalide.

PAUL R. AUSTIN.

CERTIFICATE OF CORRECTION.

Patent No. 2,316,215.   April 13, 1943.

PAUL R. AUSTIN.

It is hereby certified that error appears in the printed specification of the above numbered patent requiring correction as follows: Page 2, first column, line 56, Example 1, for "gradualy" read --gradually--; line 58, for "210 C." read --210° C.--; page 3, second column, line 36, claim 15, for "element" read --solvent--; and that the said Letters Patent should be read with this correction therein that the same may conform to the record of the case in the Patent Office.

Signed and sealed this 18th day of May, A. D. 1943.

Henry Van Arsdale,
(Seal)   Acting Commissioner of Patents.